(12) United States Patent
Ruelle et al.

(10) Patent No.: US 7,356,775 B2
(45) Date of Patent: Apr. 8, 2008

(54) FOCUS PRIORITY IN WINDOW MANAGEMENT

(75) Inventors: Alex Ruelle, Colombes (FR); Thomas Fortin, Chatou (FR)

(73) Assignee: NDS Limited, Middlesex (GB)

( * ) Notice: Subject to any disclaimer, the term of this patent is extended or adjusted under 35 U.S.C. 154(b) by 250 days.

(21) Appl. No.: 10/551,078

(22) PCT Filed: Sep. 5, 2005

(86) PCT No.: PCT/GB2005/003411

§ 371 (c)(1),
(2), (4) Date: Nov. 21, 2005

(87) PCT Pub. No.: WO2006/043018

PCT Pub. Date: Apr. 27, 2006

(65) Prior Publication Data

US 2007/0214426 A1   Sep. 13, 2007

Related U.S. Application Data

(60) Provisional application No. 60/624,218, filed on Nov. 2, 2004.

(30) Foreign Application Priority Data

Oct. 22, 2004   (FR)   ................................. 04 11261

(51) Int. Cl.
*G06F 3/048* (2006.01)
(52) U.S. Cl. ................................................. 715/802
(58) Field of Classification Search ...................... None
See application file for complete search history.

(56) References Cited

U.S. PATENT DOCUMENTS 4,783,648 A   11/1988   Homma et al.
5,835,088 A   11/1998   Jaaskelainen, Jr.
6,002,397 A * 12/1999   Jaaskelainen, Jr. .......... 715/805

(Continued)

FOREIGN PATENT DOCUMENTS

EP   0 247 827 A2   12/1987

(Continued)

OTHER PUBLICATIONS

Robert W. Scheifler et al., X Window System, The Complete Reference to Xlib, X Protocol, ICCCM, XLFD, (Third Edition, X Version 11, Release 5, pp. 265-268, 366, 367, 380 and 658) (Digital Press, 1992).

*Primary Examiner*—Doug Hutton
*Assistant Examiner*—Soumya Dasgupta
(74) *Attorney, Agent, or Firm*—Welsh & Katz, Ltd.

(57) ABSTRACT

A method for managing windows in a window-based display system, the method comprising providing a plurality of windows, each window being associated with an application, at least one of the plurality of windows being able to accept focus, assigning, to each one of the plurality of windows being able to accept focus, a focus priority, assigning focus to exactly one window at any time by choosing, from among the at least one of the plurality of windows able to accept focus, a window having a highest focus priority of the windows able to accept focus, and designating the chosen window as an active window. Related apparatus and methods are also described.

16 Claims, 10 Drawing Sheets

U.S. PATENT DOCUMENTS

| | | |
|---|---|---|
| 6,091,414 A | 7/2000 | Kraft, IV et al. |
| 6,300,951 B1 | 10/2001 | Filetto et al. |
| 2002/0140746 A1 | 10/2002 | Gargi |
| 2004/0056900 A1 | 3/2004 | Blume |

FOREIGN PATENT DOCUMENTS

| | | |
|---|---|---|
| EP | 0 261 463 A2 | 3/1988 |
| EP | 0 462 565 A2 | 12/1991 |
| EP | 1 418 498 A2 | 5/2004 |

* cited by examiner

FOCUS PRIORITY IN WINDOW MANAGEMENT

RELATED APPLICATION INFORMATION

The present application is a 35 USC § 371 application of PCT/GB2005/003411, filed on 5 Sep. 2005 and entitled "Focus Priority in Window Management", and which relies for priority on French Patent Application Ser. No. 04 11261 filed 22 Oct. 2004 of NDS Ltd. and U.S. Provisional Patent Application Ser. No. 60/624,218 of Ruelle et, al., filed 2 Nov. 2004, the disclosures of which are hereby incorporated herein by reference.

FIELD OF THE INVENTION

The present invention relates to window-based display systems.

BACKGROUND OF THE INVENTION

Multi-window systems, such as Microsoft Windows™ and X11 are well known in the art.

The following terms, in their various grammatical forms, are used throughout the present specification and claims as follows:

"Having the focus": When we say that a window "has the focus", it means that the multi-window system directs keyboard and remote control entries towards that window. Generally the application managing the window listens to the events so as to react to user requests.

"Active application": the active application is the application managing the window which has the focus; that application is the only application that can react to user requests.

"Window manager": a software component that supervises the window setting up/display/destruction as well as transmitting the focus between windows.

In a multi-window display system, as is well known in the art, several applications can share the screen through the window notion. The multi-window system sends user entries (keyboard, remote control, stylus . . . ) towards a single window having the focus; such a window is also termed herein "the focus window" or the "active window".

Generally, users must ask to obtain the focus on a window, although it is known that applications will "take" focus without a user request. In general, the last one who asks for the focus usually obtains it.

The following reference is also believed to represent the state of the art:

X Windows System, The complete Reference to Xlib, X Protocol, ICCCM, XLFD (Third Edition, X VERSION 11, RELEASE 5) by Robert W. Scheifler and James Gettys, published by Digital Press, pages 265-268, 366, 367, 380 and 658.

The disclosure of the reference mentioned above is hereby incorporated herein by reference.

SUMMARY OF THE INVENTION

It is believed by the inventors of the present invention that managing the focus in a multi-window environment generally implies the following problems. The problems, and the solutions thereto provided by preferred embodiments of the present invention, are particularly applicable to an environment in which a multi-display window system is implemented in a television system, typically a television system using a set-top-box. It is appreciated, however, that the problems and solutions are more generally applicable.

I. Not Losing the Focus

When an application displays a window on screen, the application generally requires the focus on the window, in order for the application to become an active application. But when the active application erases its window or destroys itself, where does the focus go?

For instance, suppose there are 2 applications.

Application 1 displays a window and asks for the focus on that window; it obtains the focus.

Application 2 also displays a window and asks for the focus. Application 2 obtains the focus and application 1 loses the focus.

Application 2 decides to close its window; the focus is lost, since no one gives the focus back to Application 1. Application 1 will be displayed but will not be active, and the user will have the impression that the system is "frozen".

In environments like Windows or X11, users almost always have a mouse to restore the keyboard focus to a window. The user is never "lost" without ability to restore the focus. In a system without a mouse, including, for example, a typical television-plus-set-top-box system, the user may have no mechanism for restoring focus.

II. When I Have Focus, I Do Not Want Someone to Take it From Me

Some applications, such as navigator applications in a television system, play a special role in the system. When the navigator applications are displayed, they require the focus and do not want to lose the focus to other "ordinary" applications.

It is possible to use a so-called "modal window" approach to generally solve the problem: Assume that a particular window has the focus, and the application associated with that window never wants to give the focus to another window; such a window is known as a "modal window". However, if several windows can be "modal" at the same time, we revert to the same problem as with "normal" windows: it is impossible (without knowing details of the other applications) to be certain of not losing the focus.

In order to help applications to remain independent and to help focus navigation between applications, the present invention, in preferred embodiments thereof, assigns a focus priority to each of the windows. The priority helps the window manager to manage the focus attribution correctly between the different windows. The focus priority can, in certain preferred embodiments of the present invention, be implemented as a "focus priority" attribute, which may, in some embodiments, be represented as an integer.

The window manager preferably stores a list of "possible active" windows organized by focus priority. When an application requests a focus on a window, or when an active window disappears, the window manager, taking account of the stored information, is able to act correctly.

There is thus provided in accordance with a preferred embodiment of the present invention, a method for managing windows in a window-based display system, the method including providing a plurality of windows, each window being associated with an application, at least one of the plurality of windows being able to accept focus, assigning, to each one of the plurality of windows being able to accept focus, a focus priority, assigning focus to exactly one window at any time by choosing, from among the at least one of the plurality of windows able to accept focus, a window having a highest focus priority of the windows able to accept focus, and designating the chosen window as an active window.

Further in accordance with a preferred embodiment of the present invention, the method includes maintaining an ordered list, in order of focus priority, of the at least one of the plurality of windows which is able to accept focus, giving preference within any one focus priority to one or more windows which have requested focus.

Still further in accordance with a preferred embodiment of the present invention the assigning focus is performed by assigning focus based on the order of the ordered list.

Additionally in accordance with a preferred embodiment of the present invention, the method includes upon occurrence of an event which causes the active window to become non-active, performing the assigning focus to exactly one window, thus designating a new active window.

Moreover in accordance with a preferred embodiment of the present invention the event which causes the active window to become non-active includes at least one of the following closing of the active window, and the active window becoming hidden.

There is also provided in accordance with another preferred embodiment of the present invention a window-based display system for managing windows, including a window display module to provide a plurality of windows, each window being associated with an application, at least one of the plurality of windows being able to accept focus, a priority assignment module to assign, to each one of the plurality of windows being able to accept focus, a focus priority, a focus assignment module to assign focus to exactly one window at any time by choosing, from among the at least one of the plurality of windows able to accept focus, a window having a highest focus priority of the windows able to accept focus, and an active window designation module to designate the chosen window as an active window, wherein the window display module, the priority assignment module, the focus assignment module and the active window designation module are operationally associated with each other.

Further in accordance with a preferred embodiment of the present invention, the system includes a list maintenance module to maintain an ordered list, in order of focus priority, of the at least one of the plurality of windows which is able to accept focus, giving preference within any one focus priority to one or more windows which have requested focus.

Still further in accordance with a preferred embodiment of the present invention the focus assignment module is adapted to assign focus based on the order of the ordered list.

Additionally in accordance with a preferred embodiment of the present invention the focus assignment module is adapted to assign focus to exactly one window upon occurrence of an event which causes the active window to become non-active.

Moreover in accordance with a preferred embodiment of the present invention the event which causes the active window to become non-active includes at least one of the following closing of the active window, and the active window becoming hidden.

There is also provided in accordance with still another preferred embodiment of the present invention a computer program product readable by a machine, tangibly embodying a program of instructions executable by the machine to perform a method for managing windows in a window-based display system, the method including providing a plurality of windows, each window being associated with an application, at least one of the plurality of windows being able to accept focus, assigning, to each one of the plurality of windows being able to accept focus, a focus priority, assigning focus to exactly one window at any time by choosing, from among the at least one of the plurality of windows able to accept focus, a window having a highest focus priority of the windows able to accept focus, and designating the chosen window as an active window.

Further in accordance with a preferred embodiment of the present invention the method further includes maintaining an ordered list, in order of focus priority, of the at least one of the plurality of windows which is able to accept focus, giving preference within any one focus priority to one or more windows which have requested focus.

Still further in accordance with a preferred embodiment of the present invention the assigning focus is performed by assigning focus based on the order of the ordered list.

Additionally in accordance with a preferred embodiment of the present invention the method further includes, upon occurrence of an event which causes the active window to become non-active, performing the assigning focus to exactly one window, thus designating a new active window.

Moreover in accordance with a preferred embodiment of the present invention the event which causes the active window to become non-active includes at least one of the following closing of the active window, and the active window becoming hidden.

There is also provided in accordance with still another preferred embodiment of the present invention a method for managing windows in a window-based display system, the method including providing a plurality of windows, each window being associated with an application, at least one of the plurality of windows being able to accept focus, assigning, to each one of the plurality of windows, a focus priority, maintaining an ordered list, in order of focus priority, of the at least one of the plurality of windows which is able to accept focus, giving preference within any one focus priority to one or more windows which have requested focus, and assigning focus to exactly one window at any time by choosing, from among the at least one of the plurality of windows which is able to accept focus, a window having the highest focus priority and designating the chosen window as an active window.

Further in accordance with a preferred embodiment of the present invention, the method includes upon occurrence of an event which causes the active window to become non-active, performing the assigning focus to exactly one window, thus designating a new active window.

Still further in accordance with a preferred embodiment of the present invention the event which causes the active window to become non-active includes at least one of the following closing of the active window, and the active window becoming hidden.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Reference is now made to FIGS. 1-9, which are simplified partly pictorial/partly block diagram illustrations of the operation of a system 10 constructed and operative in accordance with a preferred embodiment of the present invention. It is appreciated that FIGS. 1-9 provide specific simplified examples of the operation of the present invention, and that the present invention is not limited to the specific example shown in FIGS. 1-9.

Figure 1:
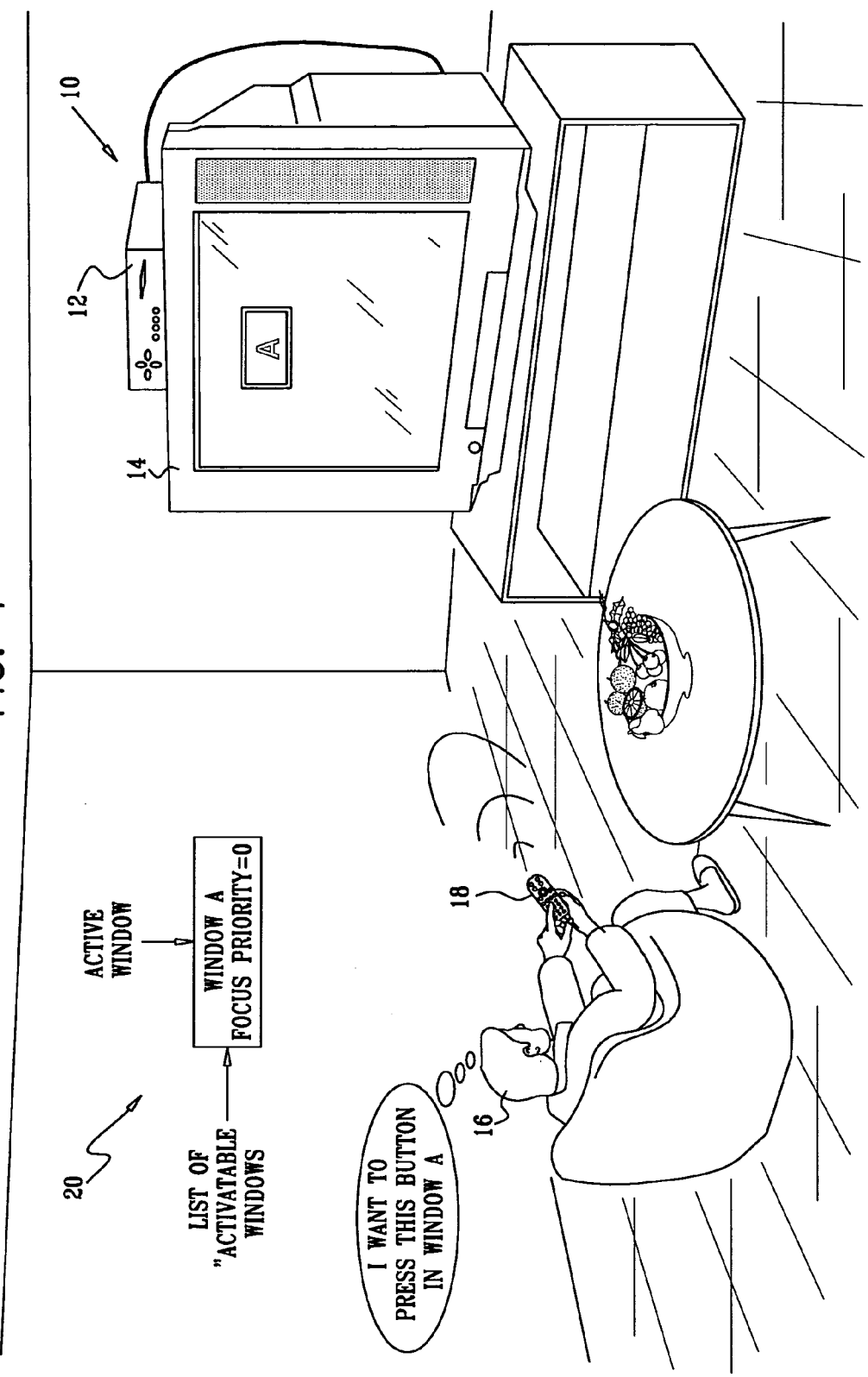
FIGS. 1-9 are simplified partly pictorial/partly block diagram illustrations of the operation of a system constructed and operative in accordance with a preferred embodiment of the present invention.

Reference is now made to FIG. 1, which shows an example in which there is only one window, window A. The system 10 is shown implemented on a set top box 12. The system 10 is preferably managed by a window manager 22 described in more detail with reference to FIG. 10. The set top box 12 operates in association with a television 14. The set top box 12 receives instructions from a viewer 16, typically via a remote control 18. However, it will be appreciated by those ordinarily skilled in the art that the system 10 can be implemented on a suitable system, for example, but not limited to, a computer system. The window A is the only window in a list of "activatable" windows 20. The window A is the active window. The viewer 16 presses a button of the remote control 18 thereby sending an event from the remote control 18 to the set top box 12.

Figure 2:
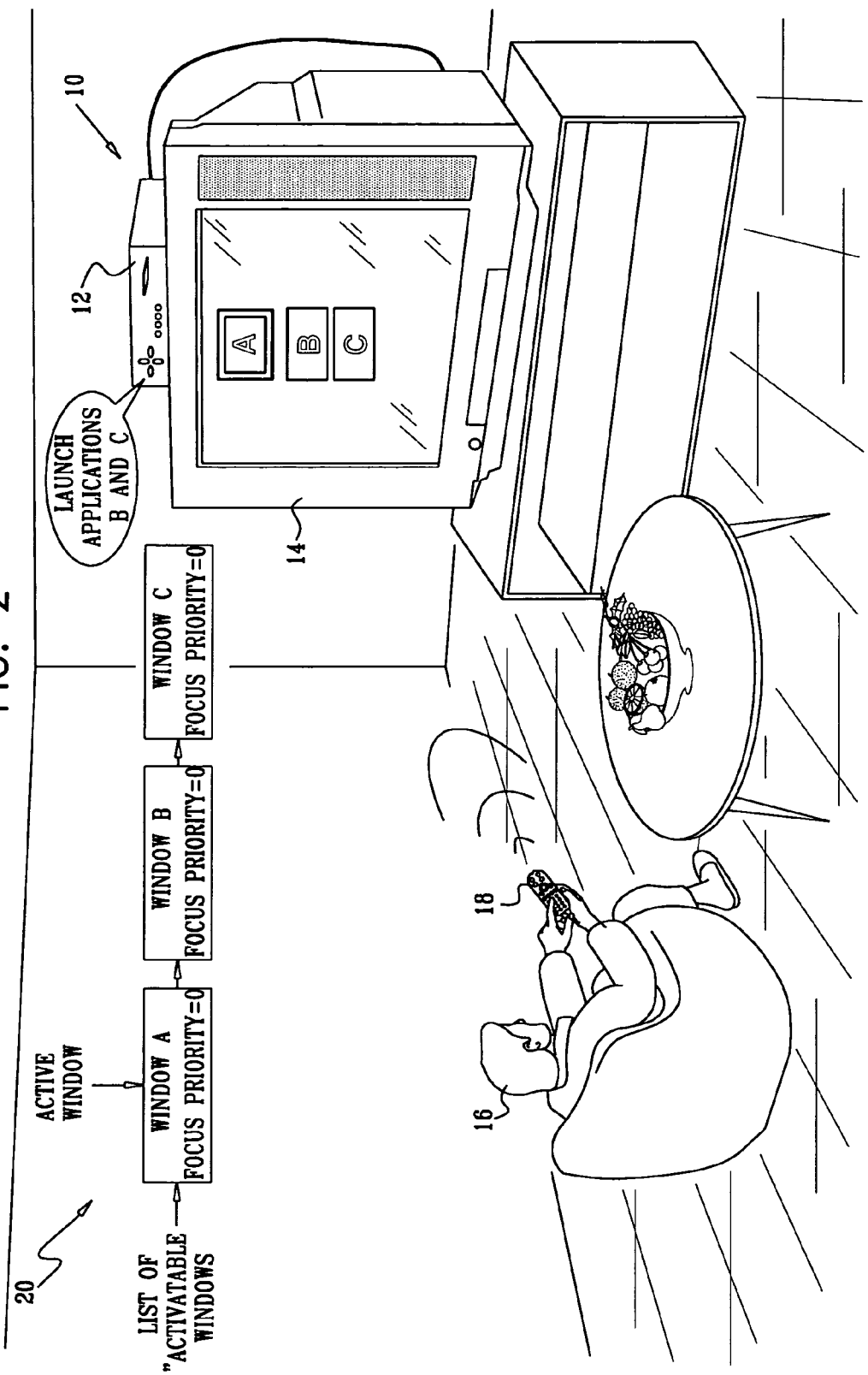

Reference is now made to FIG. 2. The application running window A receives the event of the viewer 16 and reacts by launching an application B and an application C which in turn display a window B, and then a window C, respectively. All the displayed windows have the same focus priority. The window B and the window C are added at the end of the list of "activatable" windows 20, preferably in the order in which they were created.

Figure 3:
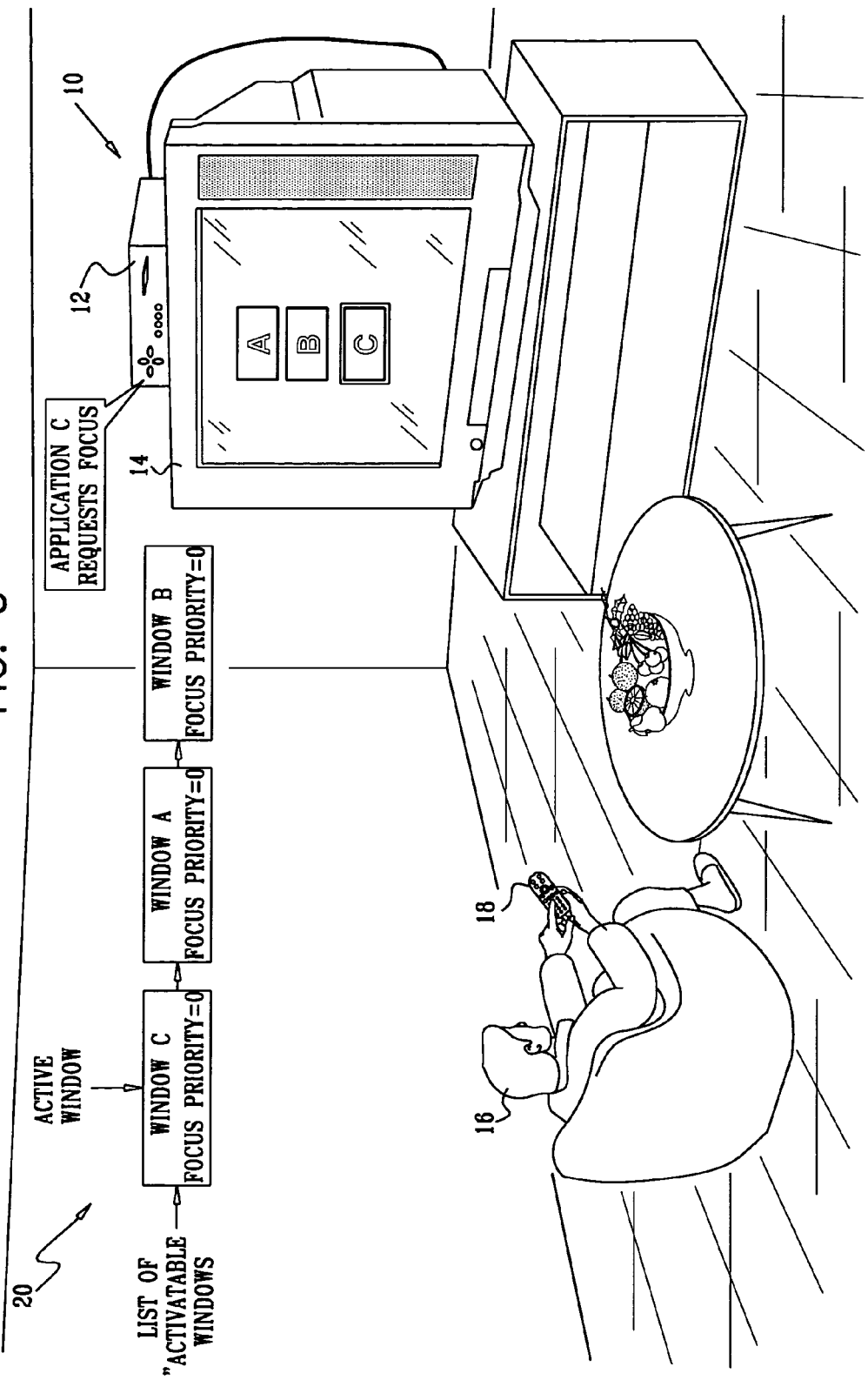

Reference is now made to FIG. 3. Now the application running window C requests the focus on the window C; the window C passes in front of the window A in the list of "activatable" windows 20 and becomes the active window.

Figure 4:
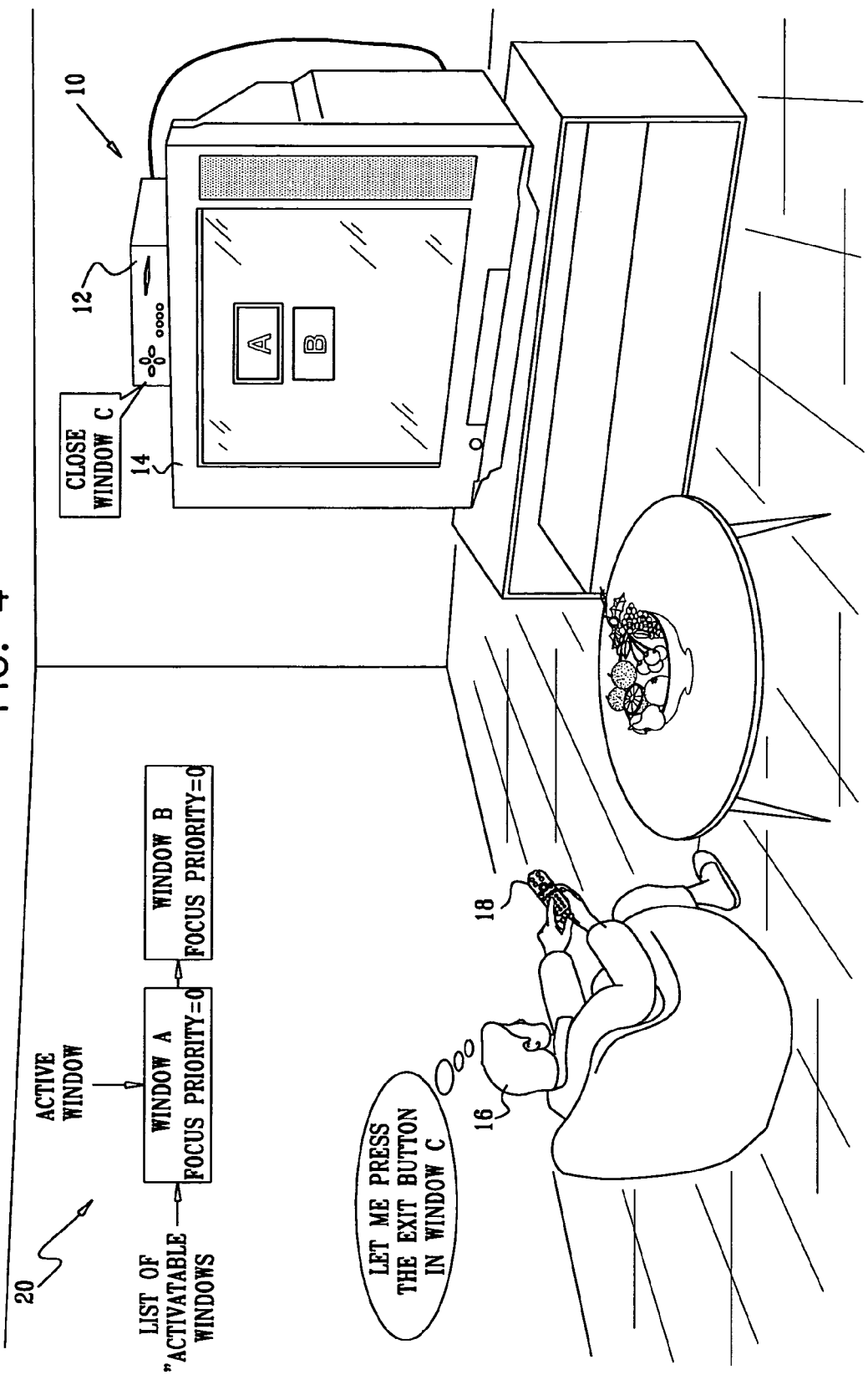

Reference is now made to FIG. 4. Now the viewer 16 presses on an "exit" button in the window C, which sends an event via the remote control 18 to the set top box 12. The application running the window C on the set top box 12 suppresses the active window C. The window manager 22 (FIG. 10) attributes the focus automatically to the window A which is now at the top of the list of "activatable" windows 20. The list of "activatable" windows 20 allows the window manager 22 to redistribute the focus in an intelligent way, especially when two or more windows have an equal focus priority.

Figure 5:
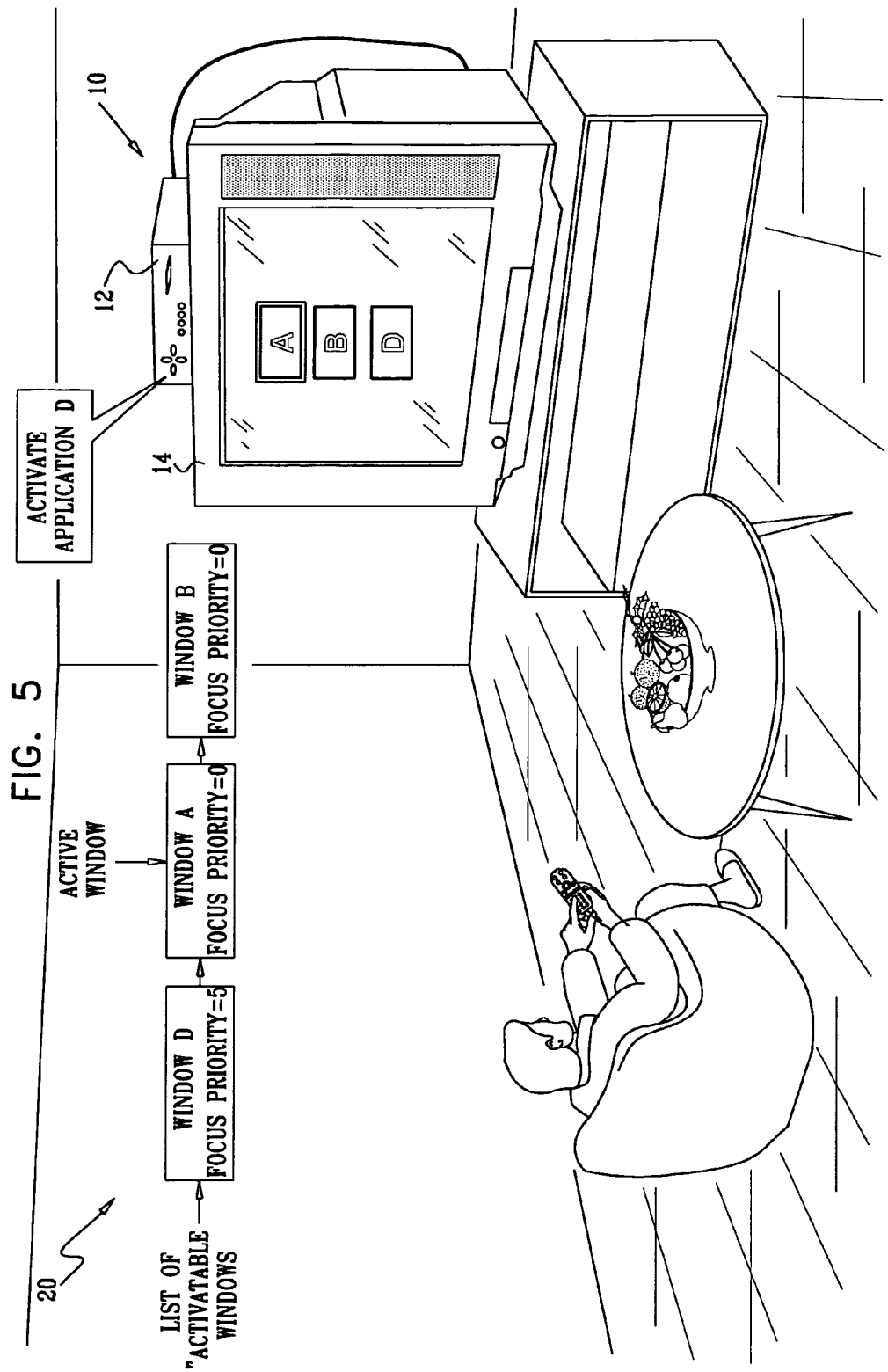

Reference is now made to FIG. 5. A window D is created by the set top box 12, with a priority focus equal to 5. The window D is placed at the top of the list of "activatable" windows 20, but the window D is not declared as the active window because the window D has not requested the focus.

Figure 6:
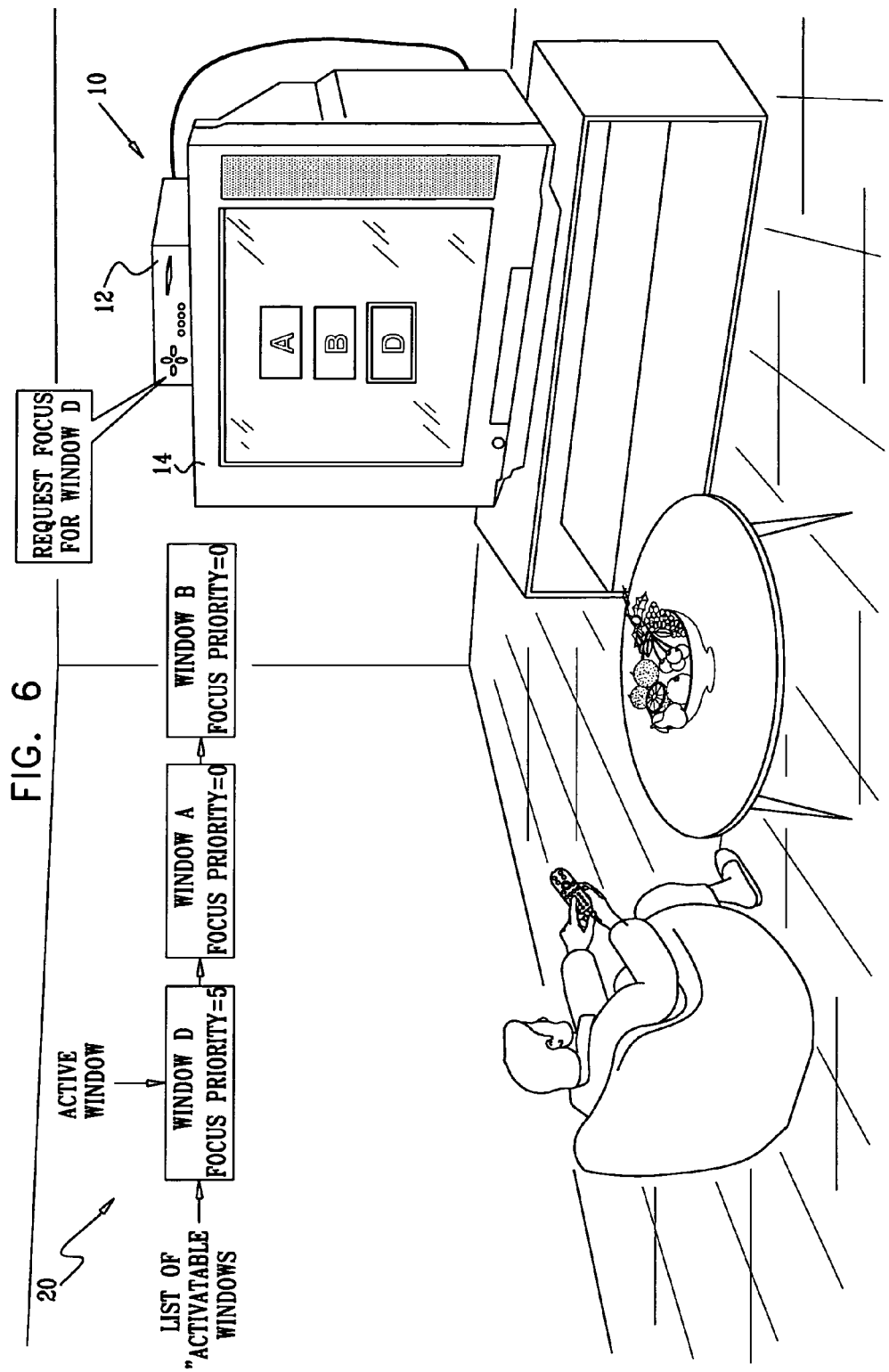

Reference is now made to FIG. 6. The application that controls the window D requests the focus. As the focus priority for the window D is higher than that for the previously active window (window A), window D becomes the new active window.

Figure 7:
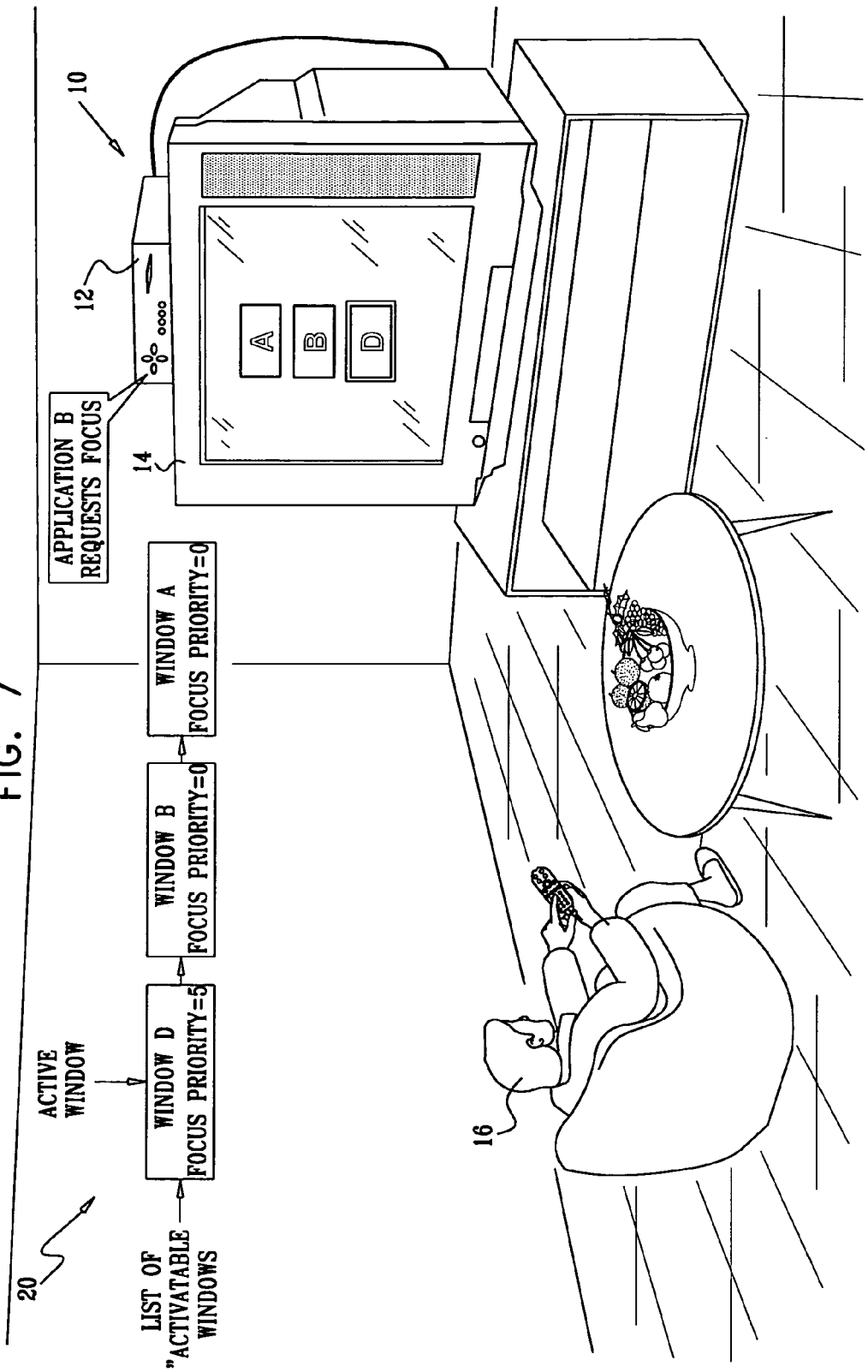

Reference is now made to FIG. 7. Now, the application running the window B requests focus for the window B. The window manager 22 (FIG. 10) does not allow focus to be given to the window B, because the window B's priority level is inferior to the active window's (the window D) priority level. However, the window B goes to the top of the list of "activatable" windows 20 with priority zero.

Figure 8:
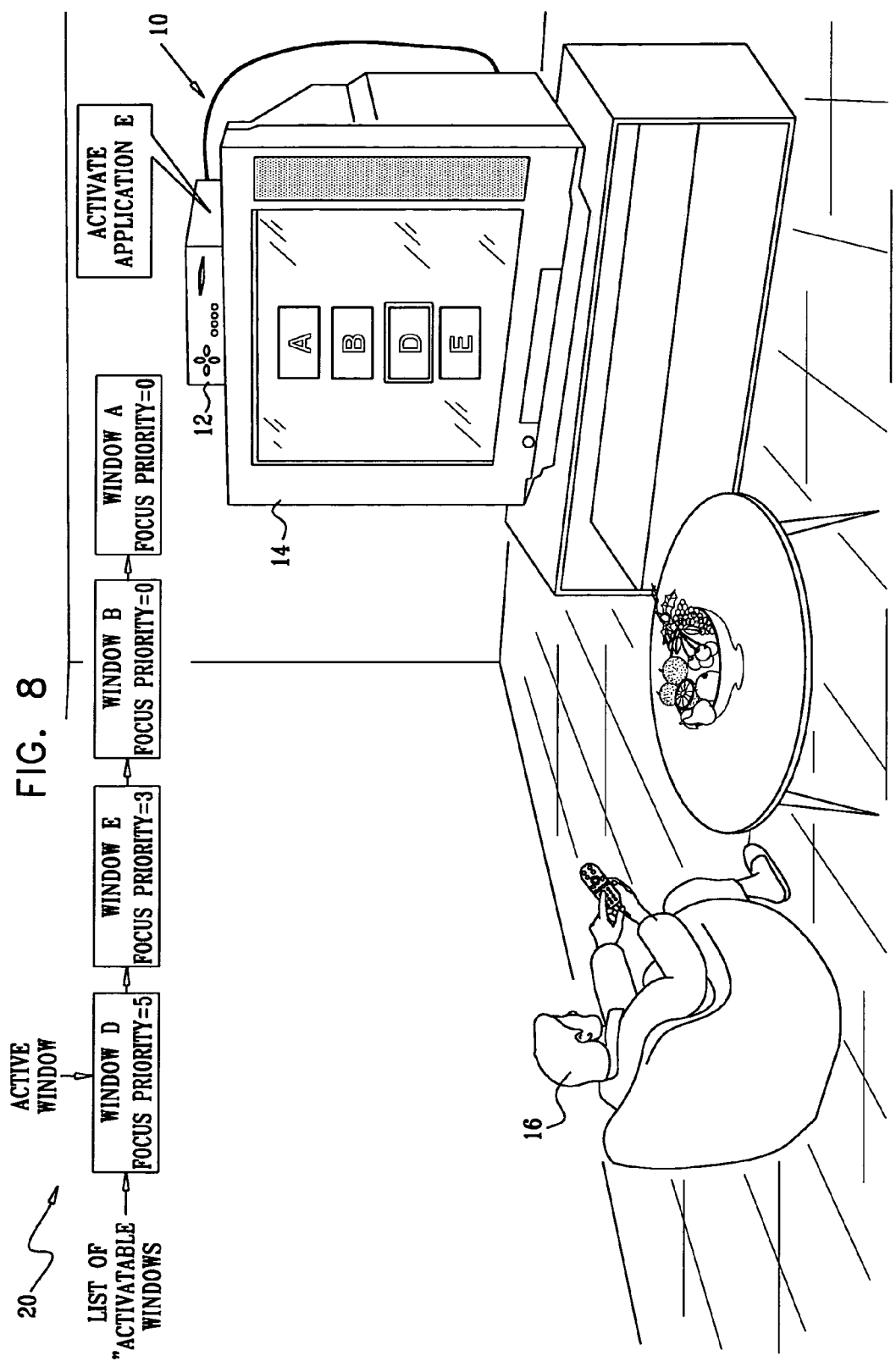

Reference is now made to FIG. 8. Now, the set top box 12 activates a window E for an application. The window E has a focus priority of 3. Therefore, the window E is positioned between the window D and the window B in the list of "activatable" windows 20.

Figure 9:
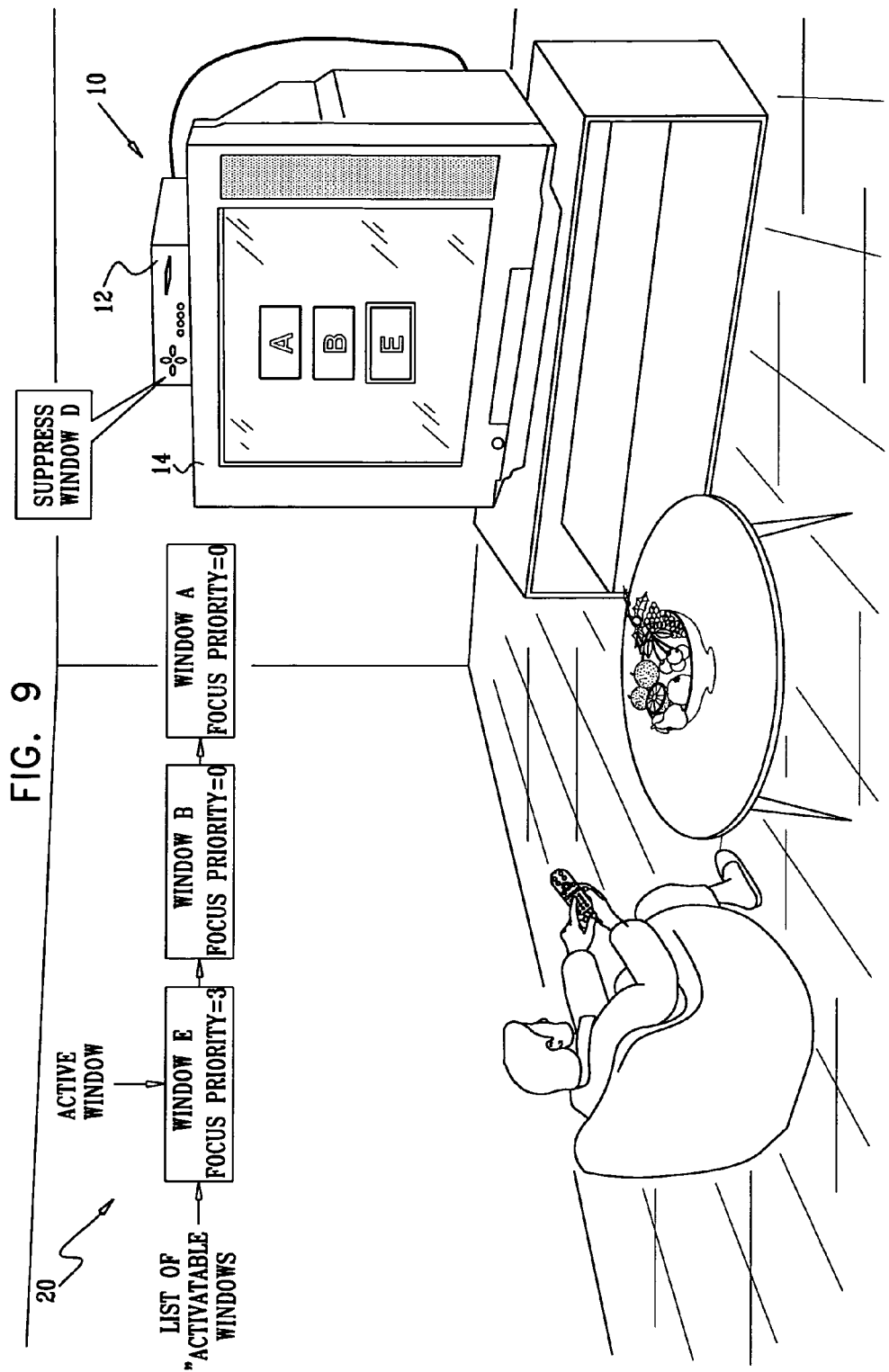

Reference is now made to FIG. 9. Finally, the window D is suppressed by set top box 12. The window manager 22 (FIG. 10) attributes the focus to the window E which is now at the top of the list of "activatable" windows 20. It should be noted that in accordance with the preferred embodiment of the present invention, focus is not transferred to the window B which has requested focus, even though the window E has not requested focus as the window E has a higher focus priority than the window B.

Persons skilled in the art will appreciate that the present invention, in preferred embodiments thereof as described above, provides the following advantages over the prior art:

Managing a list of windows that can be activated provides an intelligent and unusual redistribution of the focus by the system.

The focus priority notion associated with the windows enables the system to define the focus transmission policy simply and efficiently between applications.

Figure 10:
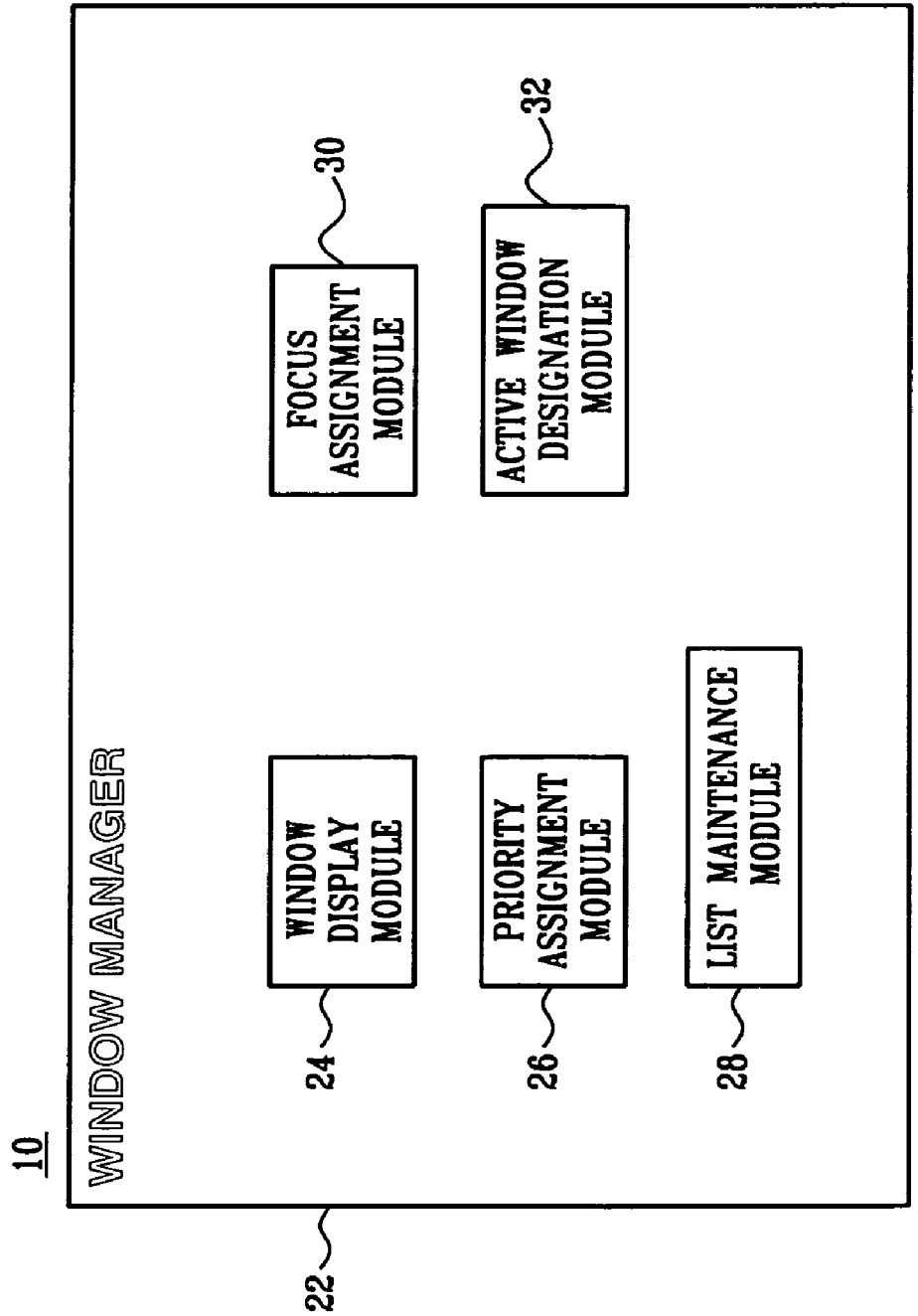
FIG. 10 is a block diagram view of the system of FIGS. 1-9.

Reference is now made to FIG. 10, which is a block diagram view of the window manager 22 of the system 10 of FIGS. 1-9. Window manager 22 preferably includes a window display module 24, a priority assignment module 26, a list maintenance module 28, a focus assignment module 30 and an active window designation module 32.

The window display module 24 is preferably adapted to provide a plurality of windows, each window being associated with an application. One or more of the windows is able to accept focus.

The priority assignment module 26 is preferably adapted to assign, to each one of the windows being able to accept focus, a focus priority.

The list maintenance module 28 is preferably adapted to maintain an ordered list, in order of focus priority, of the windows able to accept focus, giving preference within any one focus priority to windows having requested focus.

The focus assignment module 30 is preferably adapted to assign focus to exactly one window at any time by choosing, from among the windows able to accept focus, a window having a highest focus priority of the windows able to accept focus. The focus assignment module is adapted to assign focus to the chosen window upon occurrence of an event which causes the active window to become non-active, for example, but not limited to, closing of the active window or the active window becoming hidden. Typically, the focus assignment module 30 is adapted to assign focus based on the order of the ordered list.

The active window designation module 32 is preferably adapted to designate the chosen window as an active window.

The window display module 24, the priority assignment module 26, the list maintenance module 28, the focus assignment module 30 and the active window designation module 32 are preferably operationally associated with each other.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. In an environment including a set-top box associated with a television system, the set-top box being operative to receive instructions from a viewer via a remote control, the set-top box running a window-based display system, a method for managing the window-based display system, the method comprising:
   providing a plurality of windows, each of the windows being associated with an application, at least someone of the plurality of windows being able to accept focus;
   assigning, to each one of the plurality of windows being able to accept focus, a focus priority;
   automatically, without the need to receive any instruction from the viewer, assigning focus to exactly one window at any time by choosing, from among the at least one of the plurality of windows able to accept focus, a window having a highest focus priority of the windows able to accept focus, so that requesting focus for one of the windows does not necessarily allow focus to be given to the one window requesting focus; and
   designating the chosen window as an active window.

2. The method according to claim 1, further comprising:
   maintaining an ordered list, in order of focus priority, of the at least one of the plurality of windows which is able to accept focus, giving preference within any one focus priority to one or more windows which have requested focus.

3. The method according to claim 2, wherein the assigning focus is performed by assigning focus based on the order of the ordered list.

4. The method according to claim 1, further comprising:
   upon occurrence of an event which causes the active window to become non-active, performing the assigning focus to exactly one window, thus designating a new active window.

5. The method according to claim 4, wherein the event which causes the active window to become non-active comprises at least one of the following: closing of the active window; and the active window becoming hidden.

6. A set-top box system associated with a television system, the set-top box system comprising:
   a window-based display sub-system for managing windows displayed on the television system, the sub-system including:
      a window display module to provide a plurality of windows, each of the windows being associated with an application, at least some of the plurality of windows being able to accept focus;
      a priority assignment module to assign, to each one of the plurality of windows being able to accept focus, a focus priority;
      a focus assignment module to assign focus to exactly one window at any time by choosing, from among the at least one of the plurality of windows able to accept focus, a window having a highest focus priority of the windows able to accept focus, so that requesting focus for one of the windows does not necessarily allow focus to be given to the one window requesting focus; and
      an active window designation module to designate the chosen window as an active window,
   wherein the window display module, the priority assignment module, the focus assignment module and the active window designation module are operationally associated with each other.

7. The system according to claim 6, further comprising:
   a list maintenance module to maintain an ordered list, in order of focus priority, of the at least one of the plurality of windows which is able to accept focus, giving preference within any one focus priority to one or more windows which have requested focus.

8. The system according to claim 7, wherein the focus assignment module is operative to assign focus based on the order of the ordered list.

9. The system according to claim 6, wherein the focus assignment module is operative to assign focus to exactly one window upon occurrence of an event which causes the active window to become non-active.

10. The system according to claim 9, wherein the event which causes the active window to become non-active comprises at least one of the following: closing of the active window; and the active window becoming hidden.

11. A computer program product readable by a machine, tangibly embodying a program of instructions executable by the machine and operating in an environment including a set-top box associated with a television system, to perform a method for managing windows in a window-based display system, the method comprising:
   providing a plurality of windows, each of the windows being associated with an application, at least some of the plurality of windows being able to accept focus;
   assigning, to each one of the plurality of windows being able to accept focus, a focus priority;
   automatically, without the need to receive any instruction from the viewer, assigning focus to exactly one window at any time by choosing, from among the at least one of the plurality of windows able to accept focus, a window having a highest focus priority of the windows able to accept focus, so that requesting focus for one of the windows does not necessarily allow focus to be given to the one window requesting focus; and
   designating the chosen window as an active window.

12. The computer program product according to claim 11, wherein the method further comprises maintaining an ordered list, in order of focus priority, of the at least one of the plurality of windows which is able to accept focus, giving preference within any one focus priority to one or more windows which have requested focus.

13. The computer program product according to claim 12, wherein the assigning focus is performed by assigning focus based on the order of the ordered list.

14. The computer program product according to claim 11, wherein the method further comprises, upon occurrence of an event which causes the active window to become non-active, performing the assigning focus to exactly one window, thus designating a new active window.

15. The computer program product according to claim 14, wherein the event which causes the active window to become non-active comprises at least one of the following: closing of the active window; and the active window becoming hidden.

16. A set-top box system associated with a television system, the set-top box system including a means for managing windows, comprising:
   means for providing a plurality of windows, each of the windows being associated with an application, at least some of the plurality of windows being able to accept focus;

means for assigning a focus priority to each one of the plurality of windows being able to accept focus;

means for assigning focus to exactly one window at any time by choosing, from among the at least one of the plurality of windows able to accept focus, a window having a highest focus priority of the windows able to accept focus, so that requesting focus for one of the windows does not necessarily allow focus to be given to the one window requesting focus; and means for designating the chosen window as an active window, wherein the means for providing a plurality of windows, the means for assigning a focus priority, the means for assigning focus and the means for designating are operationally associated with each other.

* * * * *

UNITED STATES PATENT AND TRADEMARK OFFICE
CERTIFICATE OF CORRECTION

PATENT NO. : 7,356,775 B2 Page 1 of 1
APPLICATION NO. : 10/551078
DATED : April 8, 2008
INVENTOR(S) : Ruelle et al.

It is certified that error appears in the above-identified patent and that said Letters Patent is hereby corrected as shown below:

In claim 1 (column 7, line 13), delete "someone" and insert therefor --some--.

Signed and Sealed this

First Day of July, 2008

JON W. DUDAS
*Director of the United States Patent and Trademark Office*